(12) United States Patent
Nardi et al.

(10) Patent No.: US 10,576,543 B2
(45) Date of Patent: Mar. 3, 2020

(54) ALLOYING METAL MATERIALS TOGETHER DURING ADDITIVE MANUFACTURING OR ONE OR MORE PARTS

(71) Applicant: United Technologies Corporation, Farmington, CT (US)

(72) Inventors: Aaron T. Nardi, East Granby, CT (US); Zissis Dardas, Worcester, MA (US)

(73) Assignee: United Technologies Corporation, Farmington, CT (US)

( * ) Notice: Subject to any disclaimer, the term of this patent is extended or adjusted under 35 U.S.C. 154(b) by 642 days.

(21) Appl. No.: 15/111,400

(22) PCT Filed: Jan. 22, 2015

(86) PCT No.: PCT/US2015/012479
§ 371 (c)(1),
(2) Date: Jul. 13, 2016

(87) PCT Pub. No.: WO2015/112730
PCT Pub. Date: Jul. 30, 2015

(65) Prior Publication Data
US 2016/0325355 A1    Nov. 10, 2016

Related U.S. Application Data

(60) Provisional application No. 61/931,306, filed on Jan. 24, 2014.

(51) Int. Cl.
| | |
|---|---|
| *B22F 3/10* | (2006.01) |
| *B22F 3/105* | (2006.01) |
| *B33Y 10/00* | (2015.01) |
| *B22F 5/00* | (2006.01) |
| *B22F 5/04* | (2006.01) |
| *B33Y 70/00* | (2020.01) |
| *B29C 64/153* | (2017.01) |
| *B23K 26/342* | (2014.01) |
| *B23K 15/00* | (2006.01) |
| *C22C 1/04* | (2006.01) |
| *B23K 101/00* | (2006.01) |
| *B22F 1/02* | (2006.01) |
| *B22F 1/00* | (2006.01) |
| *B33Y 80/00* | (2015.01) |

(52) U.S. Cl.
CPC ............ *B22F 3/1055* (2013.01); *B22F 5/009* (2013.01); *B22F 5/04* (2013.01); *B23K 15/0086* (2013.01); *B23K 26/342* (2015.10); *B29C 64/153* (2017.08); *B33Y 10/00* (2014.12); *B33Y 70/00* (2014.12); *C22C 1/0433* (2013.01); *B22F 1/0011* (2013.01); *B22F 1/02* (2013.01); *B22F 1/025* (2013.01); *B22F 2998/10* (2013.01); *B23K 2101/001* (2018.08); *B33Y 80/00* (2014.12); *F05D 2220/30* (2013.01); *F05D 2230/22* (2013.01); *F05D 2240/12* (2013.01); *F05D 2240/30* (2013.01); *F05D 2300/17* (2013.01); *Y02P 10/295* (2015.11)

(58) Field of Classification Search
CPC .......... B22F 3/10; B22F 3/1055; B22F 5/009; B22F 5/04; B33Y 10/00; B33Y 70/00; B23K 26/342; B29C 64/153; C22C 1/0433
USPC ........................................................... 419/53
See application file for complete search history.

(56) References Cited

U.S. PATENT DOCUMENTS

| | | |
|---|---|---|
| 4,818,562 A | 4/1989 | Arcella et al. |
| 7,045,738 B1 | 5/2006 | Kovacevic et al. |
| 7,777,155 B2 | 8/2010 | Twelves, Jr. et al. |
| 7,789,037 B2 | 9/2010 | Teulet |
| 8,383,985 B2 | 2/2013 | Twelves, Jr. et al. |
| 8,460,755 B2 | 6/2013 | Rodgers |
| 8,488,994 B2 | 7/2013 | Hanson et al. |
| 2009/0200275 A1 | 8/2009 | Twelves, Jr. et al. |
| 2012/0164322 A1 | 6/2012 | Teulet |
| 2012/0228807 A1 | 9/2012 | Teulet |
| 2013/0136868 A1 | 5/2013 | Bruck et al. |
| 2013/0263977 A1 | 10/2013 | Rickenbacher et al. |
| 2013/0277891 A1 | 10/2013 | Teulet |
| 2014/0072823 A1 | 3/2014 | Hertter et al. |
| 2014/0295087 A1 | 10/2014 | Rickenbacher et al. |

FOREIGN PATENT DOCUMENTS

| | | |
|---|---|---|
| DE | 9117128 | 2/1996 |
| DE | 10039144 C1 | 11/2001 |
| EP | 0714725 A1 | 6/1996 |
| EP | 2361704 A1 | 8/2011 |

OTHER PUBLICATIONS

EP search report for EP15740655.4 dated Feb. 6, 2017.

*Primary Examiner* — Edward M Johnson
(74) *Attorney, Agent, or Firm* — Getz Balich LLC

(57) ABSTRACT

A process is provided for manufacturing a part or parts. This manufacturing process includes receiving a plurality of metal materials. The manufacturing process also includes solidifying the metal materials together using an additive manufacturing system to form at least a portion of the part, which comprises an alloy of the metal materials.

20 Claims, 5 Drawing Sheets

ALLOYING METAL MATERIALS TOGETHER DURING ADDITIVE MANUFACTURING OR ONE OR MORE PARTS

This application claims priority to PCT Patent Application No. PCT/US15/012479 filed Jan. 22, 2015 which claims priority to U.S. Patent Application No. 61/931,306 filed Jan. 24, 2014, which are hereby incorporated herein by reference in their entireties.

BACKGROUND OF THE INVENTION

1. Technical Field

This disclosure relates to materials and processes for additive manufacturing one or more parts.

2. Background Information

Various additive manufacturing processes are known in the art for forming one or more parts. The term "additive manufacturing" may describe a process where a part or parts are formed by accumulating and/or fusing material together, typically in a layer-on-layer manner Layers of powder material, for example, may be disposed and thereafter solidified sequentially onto one another to form the part(s). The term "solidify" may describe a process whereby material is sintered or otherwise melted thereby causing discrete particles of the sintered or melted material to fuse together.

Additive manufacturing processes may use a metal alloy powder to form metal alloy parts. Such a metal alloy powder, however, may be costly to manufacture due to limited production volumes. Many pure metal powders or some binary or simple alloy powders are commonly produced in high volumes. In addition, when melting the powders during additive manufacturing, alloying elements with lower melting or boiling points may be preferentially lost due to evaporation. It is therefore important to maintain specific alloy concentrations for specific additive processes to produce the same end component alloy. Additive manufacturing processes also require significant energy input to melt the metals and alloys used leading to more costly and higher power lasers, electron beams, so other heat source being used.

There is therefore a need in the art for improved additive manufacturing materials and processes which allow for tailored powder chemistry and lower power heat sources.

SUMMARY OF THE DISCLOSURE

According to an aspect of the invention, a process is provided for manufacturing a part or parts. This manufacturing process includes receiving a plurality of metal materials. The manufacturing process also includes solidifying the metal materials together using an additive manufacturing system to form at least a portion of the part, which comprises an alloy of the metal materials.

According to another aspect of the invention, a process is provided for manufacturing a part or parts from at least a plurality of metal materials. This manufacturing process includes additive manufacturing at least a portion of the part from the metal materials. The additive manufacturing includes alloying the metal materials together.

According to still another aspect of the invention, another process is provided for manufacturing a part from at least first metal material and second metal material that is different than the first metal material. This manufacturing process includes solidifying the first and the second metal materials using at least one energy beam to form at least a portion of the part. The manufacturing process also includes alloying at least the first and the second metal materials together during the solidifying.

The metal materials may be alloyed together during the solidifying.

The metal materials may be solidified (e.g., melted and fused) together using an energy beam; e.g., a laser beam or an electron beam.

The received metal materials may include a plurality of first particles configured from or otherwise including a first of the metal materials. The received metal materials may also include a plurality of second particles configured from or otherwise including a second of the metal materials.

At least some of the first particles may be mechanically mixed with at least some of the second particles before solidifying of the metal materials. For example, the first particles may be mechanically mixed with at least some of the second particles before introduction to an additive manufacturing system. In another example, the some of the first material particles may be mechanically mixed with at least some of the second material particle within the additive manufacturing system, but before solidification. In addition or alternatively, at least some of the first particles may be mechanically mixed with at least some of the second particles during the solidifying of the metal materials.

The received metal materials may include a plurality of particles. One or more of the particles may each be configured from or otherwise include a portion of one of the metal materials coated on at least a portion of another one of the metal materials.

The received metal materials may include a plurality of particles. One or more of the particles may each be configured from or otherwise include at least a portion of one of the metal materials encapsulated by at least a portion of another one of the metal materials.

The received metal materials may include a plurality of particles. One or more of the particles may each be configured from or otherwise include at least a portion of one of the metal materials bonded to at least a portion of another one of the metal materials.

One or more of the received metal materials may be configured from or otherwise include non-alloyed metal. In addition or alternatively, one or more of the received metal materials may be configured from or otherwise include metal alloy.

One or more of the received metal materials may each be or include one or more of the following metals: nickel, titanium, aluminum, copper, chrome, vanadium, yttrium, zirconium and hafnium. One of the received metals, for example, may be configured from substantially pure titanium or titanium alloy.

The additive manufacturing may include solidifying the metal materials together.

At least some of the metal materials may be mechanically mixed together before the solidifying of the metal materials. In addition or alternatively, at least some of the metal materials may be mechanically mixed together during the solidifying of the metal materials.

The metal materials may include a plurality of particles which are solidified together during the additive manufacturing. One or more of these particles may each be configured from or otherwise include at least a portion of a first of the metal materials and at least a portion of a second of the metal materials.

The first metal material may be mechanically mixed with the second metal material.

The solidifying may include solidifying a plurality of particles together. One or more of these particles may each be configured from or otherwise include at least a portion of the first metal material and at least a portion of the second metal material.

The foregoing features and the operation of the invention will become more apparent in light of the following description and the accompanying drawings.

DETAILED DESCRIPTION OF THE INVENTION

Systems and processes are described herein for manufacturing one or more parts using a plurality of different metal materials; e.g., metal materials with different chemical compositions. During manufacturing, these metal materials are combined together to form the part(s). Before this combination, the metal materials are distinct from one another. A first of the metal materials, for example, is not alloyed with a second of the metal materials. However, during the combination, the metal materials are alloyed with one another thereby at least partially forming the part(s) from an alloy of the metal materials.

Each of the metal materials may be or may include a substantially pure metal; e.g., a non-alloyed metal. Alternatively, one or more of the metal materials may each be or may include a metal alloy; e.g., an alloy of two or more different metals. Examples of the metal(s) that may be included in one or more of the metal materials include, but are not limited to, aluminum (Al), copper (Cu), titanium (Ti), nickel (Ni), vanadium (V), chromiun (Cr), yttrium (Y), zirconium (Zr), hafnium (Hf), and/or alloys thereof.

The metal materials may be received for manufacturing as one or more powders. The term "powder" may describe a quantity (e.g., an agglomeration) of discrete particles with substantially uniform or varying sizes; e.g., average diameters. The particle size of one or more of the particles may be between about five micrometers (5 μm) and about five-hundred micrometers (500 μm); e.g., between about twenty micrometers (20 μm) and about ninety micrometers (90 μm). The present invention, however, is not limited to any particular particle sizes.

Figure 1:
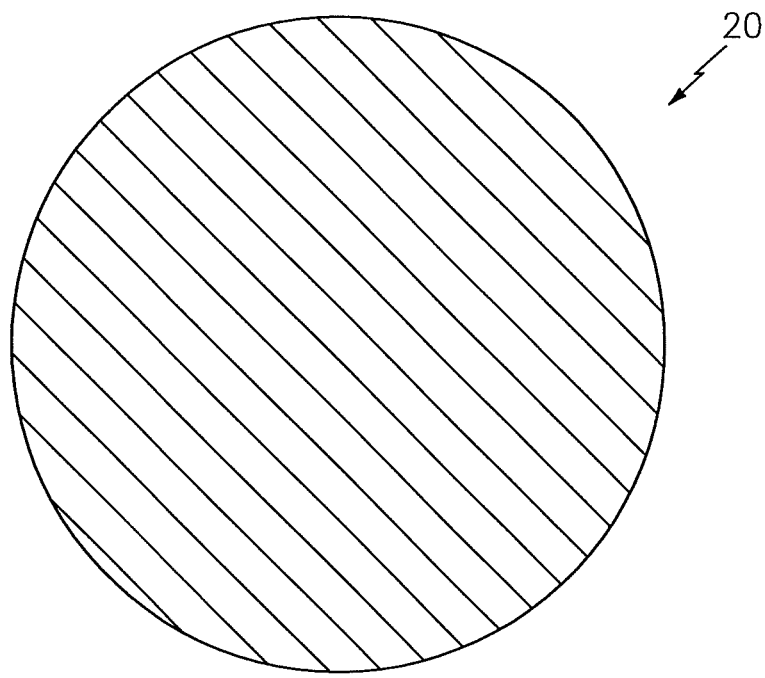
FIG. 1 is a sectional illustration of a particle of metal material.

The metal materials may be respectively received as different powders. Each of these powders includes a plurality of discrete particles 20, an exemplary one of which is illustrated in FIG. 1. Each of the particles 20 may be configured as or include a discrete solid mass of the respective metal material. More particularly, each particle 20 may be configured substantially without other metal materials. Each particle 20 may also be configured substantially without other non-metal materials; e.g., composed solely of a respective one of the metal materials.

Figure 2:
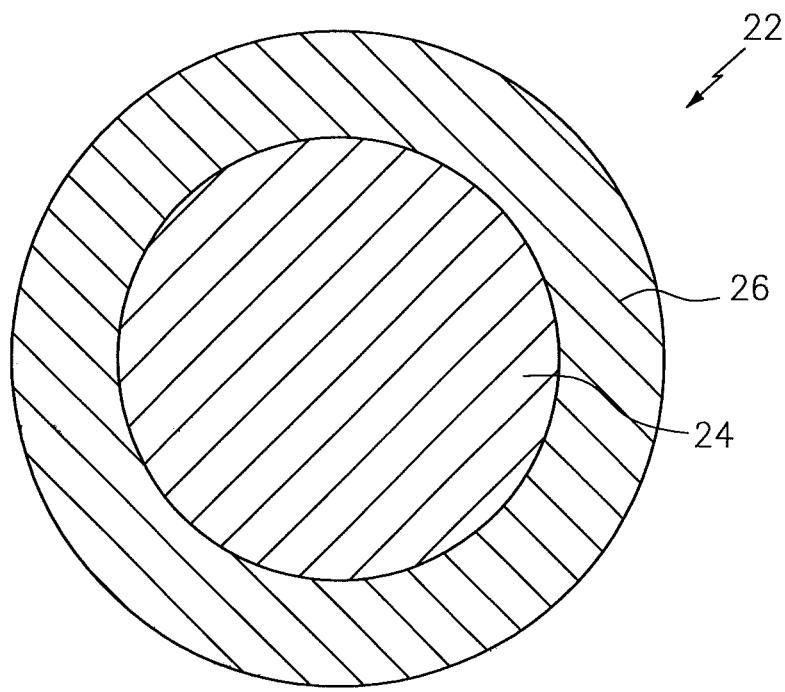
FIGS. 2-5 are sectional illustrations of respective particles, each particle including a plurality of metal materials.
Figure 3:
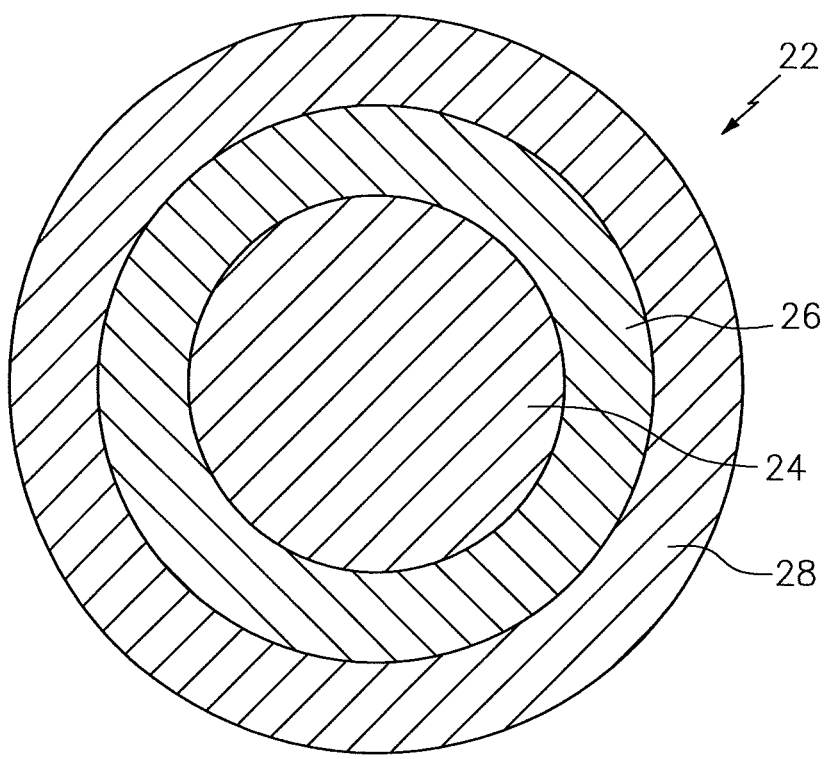
Figure 4:
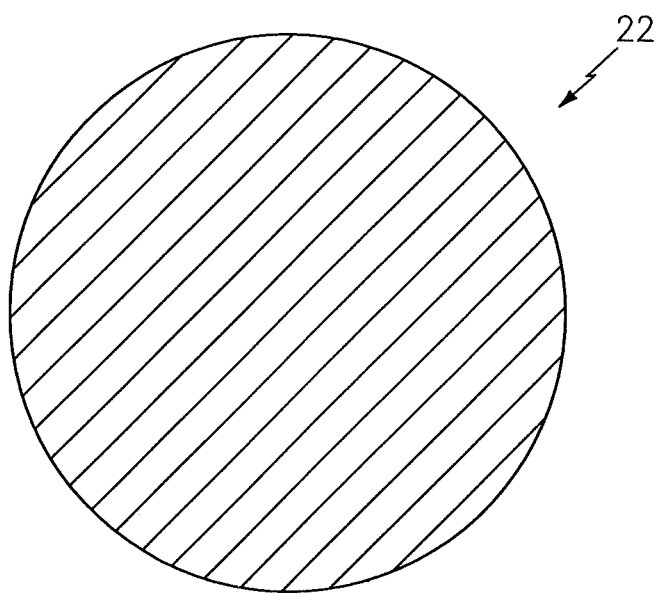
Figure 5:
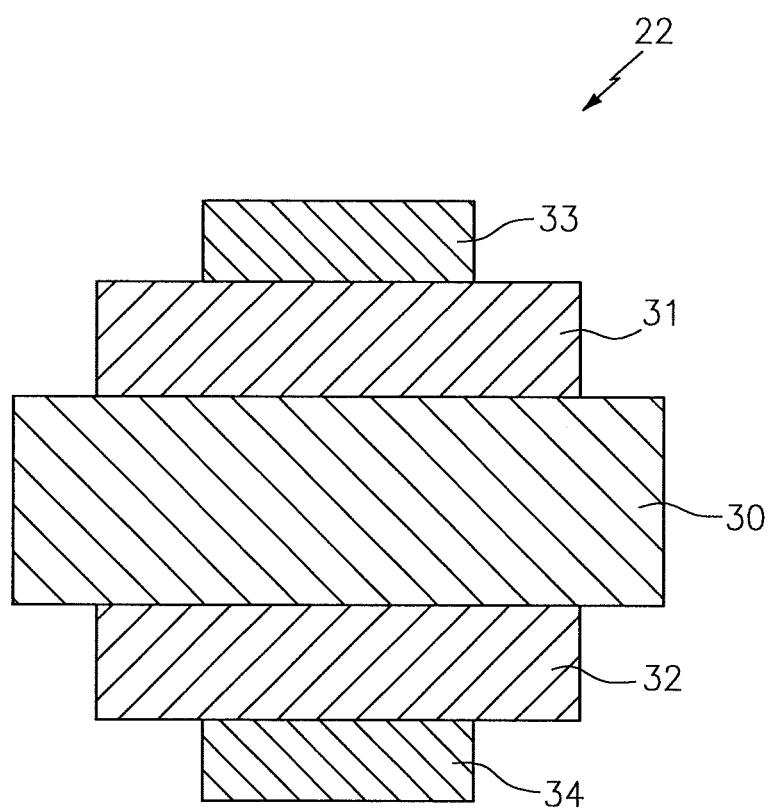

Some or all of the metal materials may alternatively be received together as compounded powder (or powders). This powder includes a plurality of discrete particles 22, exemplary ones of which are illustrated in FIGS. 2-5. Referring to FIG. 2, one or more of the particles 22 each includes a core 24 of a first of the metal materials at least partially coated (e.g., encapsulated) by a coating 26 of a second of the metal materials. Referring to FIG. 3, the coating 26 of the second metal material may similarly be at least partially coated (e.g., encapsulated) by a coating 28 of another one of the metal materials; e.g., the first metal material or a third of the metal materials. Referring to FIG. 4, one or more of the particles 22 are each configured from a spray dried blend of two or more of the metal materials. Referring to FIG. 5, one or more of the particles 22 each includes a plurality of layers 30-34 that are respectively bonded (e.g., welded, adhered, etc.) to one another. One of the particles 22, for example, may be produced through a mechanical milling process where the layers are bonding together through cold welding. Each of these layers 30-34 may be configured from or otherwise include a respective (e.g., different) one of the metal materials. The present invention, however, is not limited to the above described metal material particle configurations.

In each example of blended, agglomerated, or layered particles, the elemental combination can be selected such that during the melting and alloying process the materials react exothermically reducing the energy input required. A decision for which elements to pre-alloy and which elements to alloy during the melting process can then be based on an assessment of the thermodynamic energy balance during the deposition process.

Figure 6:
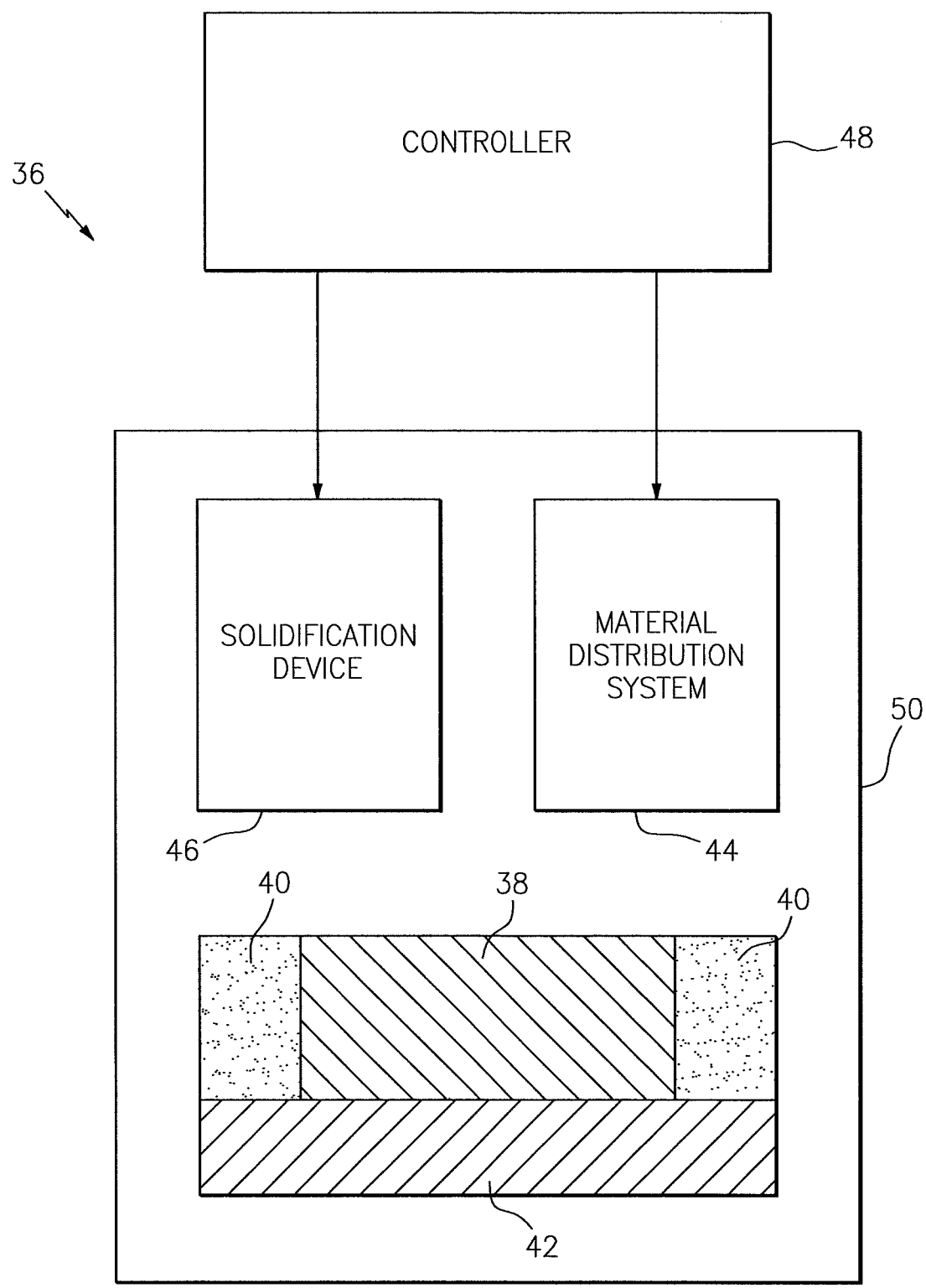
FIG. 6 is a block diagram of a system for additively manufacturing one or more parts.

FIG. 6 illustrates a system 36 for additive manufacturing at least one part 38 from metal materials 40 (e.g., metal powders) such as those described above. This additive manufacturing system 36 includes a base 42, a material distribution system 44 and a solidification device 46. The additive manufacturing system 36 also includes a controller 48 in signal communication (e.g., hardwired and/or wirelessly coupled) with one or more of the system components 44 and 46.

The base 42 may be configured as or located within an enclosed housing 50 (e.g., a seal enclosure) in which at least a portion of one or more of the system components 44 and 46 are located. The base 42 includes a support surface 52. This support surface 52 is adapted to support the metal materials 40 and/or at least a portion of the part(s) 38 during additive manufacturing. The support surface 52, for example, may be substantially horizontal relative to gravity. The support surface 52 may also have a generally planar geometry.

The material distribution system 44 is adapted to deposit quantities of the metal materials 40 onto the support surface 52. These quantities of metal materials 40 may be deposited as a substantially uniform layer of metal materials 40 over at least a portion or all of the support surface 52.

The material distribution system 44 may include a material reservoir (e.g., a hopper), a material outlet (e.g., a conduit) and a material coater (e.g., a blade). The reservoir is adapted to contain a quantity of the metal material(s) 40. The reservoir may also be adapted to mix the metal materials 40 together where, for example, the materials are different powders. The outlet is adapted to direct the metal materials 40 from the reservoir onto the support surface 52 into a mound (or mounds). The coater is adapted to spread the mound (or mounds) of metal materials 40 across at least a portion of the support surface 52 to provide the layer of metal materials. Of course, various other types and configurations of material distribution systems are known in the art, and the additive manufacturing system 36 is not limited to including any particular ones thereof.

The solidification device 46 is adapted to solidify at least a portion or all of the metal materials 40 deposited on the support surface 52 to form at least a portion of the part(s) 38. The solidification device 46, for example, may sinter or melt at least some of the deposited metal materials 40 such that the sintered or melted metal materials fuse and alloy together to form a portion of the part(s) 38.

The solidification device 46 may include at least one energy beam source such as, for example, a laser or an electron beam energy source. The energy beam source is adapted to generate at least one energy beam (e.g., a laser beam or electron beam) for sintering, melting or otherwise fusing and alloying a portion of the deposited metal materials together. The energy beam source is also adapted to move the energy beam over (e.g., selectively scan) at least a portion of the deposited metal materials 40. Of course, various other types and configurations of solidification devices are known in the art, and the additive manufacturing system 36 is not limited to including any particular ones thereof.

The controller 48 (e.g., a processing system) is adapted to signal one or more of the system components 44 and 46 to perform at least a portion of the process described below. The controller 48 may be implemented with a combination of hardware and software. The hardware may include memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 7:
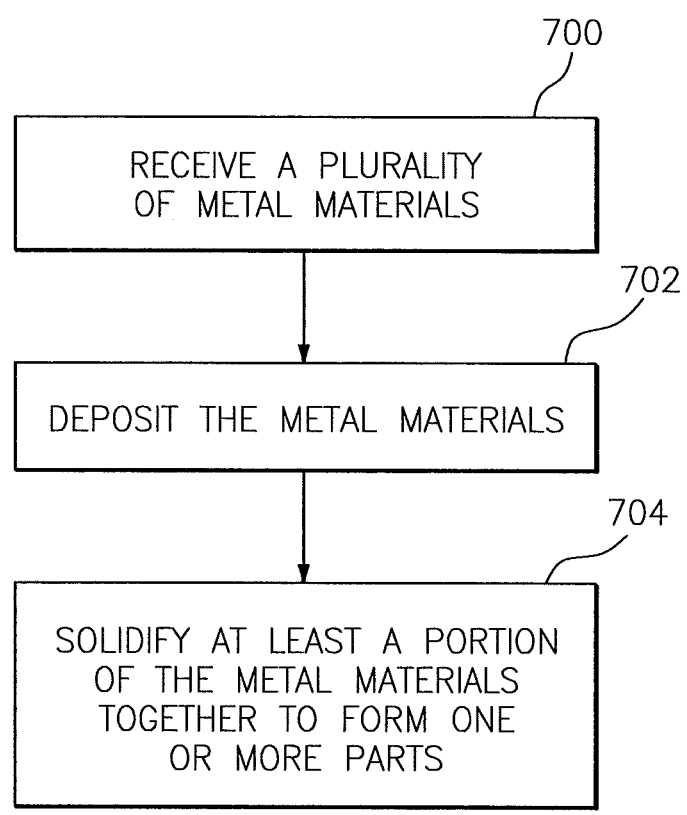
FIG. 7 is a flow diagram of a process for manufacturing one or more parts.

FIG. 7 is a flow diagram of a process for manufacturing a part 38 (or parts) using an additive manufacturing system such as the system 36. An example of the part 38 is a rotor blade for a turbine engine such as, for example, a turbine blade, a compressor blade or a fan blade. Other examples of the part 38 include a stator blade for a turbine engine, a guide vane for a turbine engine, a gas path wall for a turbine engine as well as various other components included in a turbine engine. The process of FIG. 7 and the system 36, however, may also or alternatively additively manufacture parts other than those described above or included in a turbine engine.

In step 700, the additive manufacturing system 36 receives the metal materials 40. The metal materials 40, for example, may be deposited into the reservoir of the material distribution system 44. In embodiments where the metal materials 40 are configured as more than one powder, these powders may be mechanically mixed (e.g., stirred) together within the reservoir by, for example, a mixing blade(s) and/or a hopper screw drive. Alternatively, the powders may be mechanically mixed on the support surface 52 as described below in further detail.

In step 702, quantities of the metal materials 40 are deposited on the base 42. The controller 48, for example, may signal the material distribution system 44 to deposit a substantially uniform layer of the metal materials 40 (e.g., powder(s)) on the support surface 52. This layer of metal materials 40 may be deposited directly on the support surface 52. Alternatively, the layer of metal materials 40 may be deposited on at least one layer of metal materials that was previously deposited on the support surface 52.

In step 704, at least a portion of the deposited metal materials 40 are solidified together. The controller 48, for example, may signal the solidification device 46 to selectively scan its energy beam over at least a portion of the deposited metal materials 40 to form at least a portion of the part 38. The energy beam may sinter or melt the respective metal materials. The sintered or melted metal materials may fuse and alloy together and thereafter solidify providing a solid mass of metal material alloy that forms the respective portion of the part 38. With certain metal materials 40, the alloying may be carried out through an exothermic reaction. Heat generated by this exothermic reaction may supplement heat generated by the energy beam, which may enable the solidification device 46 to reduce the energy beam power and, thus, its energy draw.

One or more of the foregoing steps of FIG. 7 may be repeated for one or more iterations to additively manufacture the part 38 (or parts) layer-by-layer.

In some embodiments, the metal material powders may be mixed together on or above the base 42. The additive manufacturing system 36, for example, may include at least one additional material distribution system 44. Each material distribution system 44 may be adapted to direct its respective metal material towards a common point or points such that the metal materials 40 mechanically mix together as they are deposited onto the support surface 52.

In some embodiments, the steps 702 and 704 may be performed substantially contemporaneously. The material distribution system 44 and the solidification device 46, for example, may be configured together as a laser applied powder device. In some embodiments, the additive manufacturing system 36 may include a plurality of the laser applied powder devices. With such a configuration, the metal material powders may be mechanically mixed together on or above the base 42 during metal material solidification.

The process of FIG. 7 may include one or more additional steps other than those described above. For example, in some embodiments, the part 38 (or parts) may undergo additional manufacturing processes during and/or after the material buildup step 704. Examples of such additional manufacturing processes may include, but are not limited to, machining, surface finishing, coating, etc.

In some embodiments, the first and second metal materials may be selected such that an exothermic reaction takes place during the alloying of these metal material. An example of this would be in creating a Nickel-Chrome-Aluminum alloy for high temperature applications. For example, a Nickel-Chrome first metal material may be combined with an aluminum second metal material. However, in other embodiments, a Nickel-Aluminum first metal material may be combined with a Chromium second metal material.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A process for manufacturing a part, the process comprising:
   receiving a plurality of metal materials; and
   solidifying the metal materials together using an additive manufacturing system to form at least a portion of the part which comprises an alloy of the metal materials.

2. The process of claim 1, further comprising alloying the metal materials together during the solidifying.

3. The process of claim 1, wherein the metal materials are solidified together using an energy beam.

4. The process of claim 1, wherein the metal materials produce an exothermic reaction during alloying.

5. The process of claim 1, wherein the received metal materials include
a plurality of first particles comprising a first of the metal materials; and
a plurality of second particles comprising a second of the metal materials.

6. The process of claim 5, wherein at least some of the first particles are mechanically mixed with at least some of the second particles before the solidifying of the metal materials.

7. The process of claim 5, wherein at least some of the first particles are mechanically mixed with at least some of the second particles during the solidifying of the metal materials.

8. The process of claim 1, wherein
the received metal materials include a plurality of particles; and
one or more of the particles each comprises at least a portion of one of the metal materials coated on at least a portion of another one of the metal materials.

9. The process of claim 1, wherein
the received metal materials include a plurality of particles; and
one or more of the particles each comprises at least a portion of one of the metal materials encapsulated by at least a portion of another one of the metal materials.

10. The process of claim 1, wherein
the received metal materials include a plurality of particles; and
one or more of the particles each comprises at least a portion of one of the metal materials bonded to at least a portion of another one of the metal materials.

11. The process of claim 1, wherein one of the received metal materials comprises non-alloyed metal.

12. The process of claim 1, wherein one of the received metal materials comprises metal alloy.

13. The process of claim 1, wherein one of the received metal materials comprises one or more of the following metals: nickel, titanium, aluminum, copper, chrome, vanadium, yttrium, zirconium, and hafnium.

14. A process for manufacturing a part from at least a plurality of metal materials, the process comprising:
additive manufacturing at least a portion of the part from the metal materials;
wherein the additive manufacturing comprises alloying the metal materials together.

15. The process of claim 14, wherein the additive manufacturing further comprises solidifying the metal materials together.

16. The process of claim 15, further comprising mechanically mixing at least some of the metal materials together before the solidifying of the metal materials.

17. The process of claim 15, further comprising mechanically mixing at least some of the metal materials together during the solidifying of the metal materials.

18. The process of claim 14, wherein
the metal materials include a plurality of particles which are solidified together during the additive manufacturing; and
one or more of the particles each comprises at least a portion of a first of the metal materials and at least a portion of a second of the metal materials.

19. A process for manufacturing a part from at least first metal material and second metal material that is different than the first metal material, the process comprising:
solidifying the first and the second metal materials using at least one energy beam to form at least a portion of the part; and
alloying at least the first and the second metal materials together during the solidifying.

20. The process of claim 19, further comprising mechanically mixing the first metal material with the second metal material.

* * * * *